United States Patent
Yamakawa et al.

(10) Patent No.: US 6,656,633 B2
(45) Date of Patent: Dec. 2, 2003

(54) BINDER FOR ELECTRODE FOR LITHIUM ION SECONDARY BATTERY, AND UTILIZATION THEREOF

(75) Inventors: Masahiro Yamakawa, Kawasaki (JP); Takao Suzuki, Kawasaki (JP); Haruhisa Yamamoto, Tokyo (JP)

(73) Assignee: Zeon Corporation, Tokyo (JP)

( * ) Notice: Subject to any disclaimer, the term of this patent is extended or adjusted under 35 U.S.C. 154(b) by 152 days.

(21) Appl. No.: 09/912,501

(22) Filed: Jul. 26, 2001

(65) Prior Publication Data

US 2002/0034686 A1 Mar. 21, 2002

(30) Foreign Application Priority Data

Jul. 26, 2000 (JP) ........................................ 2000-225456

(51) Int. Cl.$^7$ ................................................. H01M 4/62
(52) U.S. Cl. .................. 429/217; 526/319; 429/231.95; 252/182.1
(58) Field of Search .......................... 526/319; 429/217, 429/231.95; 252/182.1

(56) References Cited

U.S. PATENT DOCUMENTS

| | | | | |
|---|---|---|---|---|
| 5,331,055 A | * | 7/1994 | Fujiwara et al. ............ | 525/244 |
| 5,595,841 A | * | 1/1997 | Suzuki ........................ | 429/217 |
| 5,972,056 A | * | 10/1999 | Brikez ........................ | 29/623.5 |
| 6,183,907 B1 | * | 2/2001 | Barusseau et al. .......... | 429/217 |
| 6,299,653 B1 | * | 10/2001 | Hoshi et al. ................ | 29/623.1 |
| 6,399,246 B1 | * | 6/2002 | Vandayburg et al. ....... | 429/217 |

FOREIGN PATENT DOCUMENTS

| JP | 08-195197 | 7/1996 |
|---|---|---|
| JP | 11-354126 | 12/1999 |

* cited by examiner

*Primary Examiner*—David W. Wu
*Assistant Examiner*—Henry S. Hu
(74) *Attorney, Agent, or Firm*—Armstrong, Kratz, Quintos, Hanson & Brooks, LLP

(57) ABSTRACT

A polymer binder for an electrode is provided, which is comprised of a polymer comprising (a) structural units derived from a monofunctional ethylenically unsaturated carboxylic acid ester monomer, (b) structural units derived from an ethylenically unsaturated carboxylic acid monomer, and (c) structural units derived from a methacrylonitrile monomer; the ratio of [(a)+(c)]/(b) being 99.9 to 1.5 by weight; the sum of (a)+(b)+(c) being at least 70 wt. % based on the total structural units of the polymer; and the polymer being substantially free from structural units derived from an ethylenically hydrocarbon monomer and structural units derived from a diene monomer. The binder exhibits enhanced electrochemical stability and is useful for making an electrode of a lithium ion secondary battery.

17 Claims, No Drawings

BINDER FOR ELECTRODE FOR LITHIUM ION SECONDARY BATTERY, AND UTILIZATION THEREOF

BACKGROUND OF THE INVENTION (1) Field of the Invention

This invention relates to a binder for an electrode for a lithium ion secondary battery, and utilization of the binder.

(2) Description of the Related Art

In recent years, portable electronic appliances such as a notebook-sized personal computer, a portable telephone and a personal digital assistant have spread wide. Among secondary batteries used as a power source of the portable electronic appliances, lithium ion secondary batteries are widely used. The lithium ion secondary batteries include, for example, a secondary battery comprising a lithium ion-containing electrolyte solution, a lithium polymer secondary battery comprising a gel-like electrolyte, a solid-type lithium secondary battery comprising a solid electrolyte, and a non-aqueous electric double layer capacitor using movement of a lithium ion.

Requirements for rendering portable electronic appliances small in size, thin in thickness, light in weight and high in performances are becoming severe. Thus the same requirements are also becoming severe for lithium ion secondary batteries. In addition, requirement for cost reduction is eagerly desired.

An electrode most widely used for a lithium ion secondary battery has a structure such that an active material is supported on a collector by a binder. As the binder for an electrode, polyvinylidene fluoride (PVDF) is widely used. However, PVDF does not have a binding power of a high level nowadays desired for an electrode collector, and thus, secondary batteries having desired performances are difficult to fabricate with PVDF binder.

Now various binders are being studied for providing secondary batteries having high performances. Polymers having structural units derived from a polar group having monomer such as an ethylenically unsaturated carboxylic acid ester monomer attract widespread attention because these polymers give high adhesion between an active material and a collector. As a specific example of such polymers, there can be mentioned a copolymer of at least one acrylic acid ester or methacrylic acid ester monomer, an acrylonitrile monomer and an acid ingredient-containing vinyl monomer (Japanese Unexamined Patent Publication No. H8-287915). A secondary battery having a positive electrode or negative electrode made by using this copolymer binder, exhibits good battery performances, especially good characteristics at repetition of charge-discharge cycles and a larger capacity. This is because this copolymer binder exhibits stronger force for binding an active material to each other and to a collector, than that obtained with PVDF binder. Thus, a high adhesion is manifested between an active material and a collector by using a small amount of this copolymer binder derived from a polar group-having monomer, and hence, the weight of a secondary battery can be reduced, as compared with the case where PVDF binder is used. Further, this copolymer binder is relatively inexpensive and thus the fabrication cost of a battery is reduced, However, the present inventors found that a secondary battery having an electrode made by using the above-specified copolymer binder exhibits good characteristics at repetition of charge-discharge cycles at room temperature of 20° C. to 25° C., but, especially when the copolymer binder is used for a positive electrode, the characteristics at repetition of charge-discharge cycles are drastically reduced at a high temperature of 60° C. or higher, and further that this is due to the fact that the copolymer binder contains structural units derived from an acrylonitrile monomer. It is presumed that the reduction of the characteristics at repetition of charge-discharge cycles at a high temperature is due to high electrochemical reactivity.

SUMMARY OF THE INVENTION

In view of the foregoing prior art, a primary object of the present invention is to provide a binder exhibiting good resistance to an electrolyte solution and good electrochemical stability, and giving an enhanced adhesion between an active material and a collector, which binder is suitable for the preparation of an electrode for a lithium ion secondary battery.

Another object of the present invention is to provide a binder composition comprising the above-mentioned binder and a liquid medium.

A still another object of the present invention is to provide a slurry of the above-mentioned binder, which is used for the preparation of an electrode for a lithium ion secondary battery.

A further object of the present invention is to provide an electrode for a lithium ion secondary battery exhibiting improved charge-discharge cycling characteristics at a high temperature as well as at room temperature.

A further object of the present invention is to provide a lithium ion secondary battery exhibiting improved charge-discharge cycling characteristics at a temperature of 60° C. or higher as well as at room temperature.

The present inventors have found that, when a polymer binder exhibiting a low electrochemical reactivity as measured by the cyclic voltammetry is used for the preparation of an electrode, a secondary battery with the electrode exhibits enhanced characteristics at repetition of charge-discharge cycles at a temperature of 60° C. or higher. The present invention has been completed on the basis of this finding.

Thus, in one aspect of the present invention, there is provided a binder for an electrode of a lithium ion secondary battery, which is comprised of a polymer comprising:

(a) structural units derived from a monofunctional ethylenically unsaturated carboxylic acid ester monomer, (b) structural units derived from an ethylenically unsaturated carboxylic acid monomer, and (c) structural units derived from a methacrylonitrile monomer;

the ratio of [structural units (a) plus structural units (c)]/structural units (b) being in the range of 99.9 to 1.5 by weight;

the sum of structural units (a), structural units (b) and structural units (c) being at least 70% by weight based on the weight of the total structural units of the polymer; and said polymer being substantially free from structural units derived from an ethylenically hydrocarbon monomer and structural units derived from a diene monomer.

In another aspect of the present invention, there is provided a binder composition for an electrode for a lithium ion secondary battery, which comprises the above-mentioned polymer for binder and a liquid medium having a boiling point in the range of 80° C. to 350° C. at normal pressure;

said polymer being in the form of particles dispersed in the liquid medium.

In still another aspect of the present invention, there is provided a slurry for an electrode for a lithium ion secondary battery, which comprises the above-mentioned binder and an active material.

In a further aspect of the present invention, there is provided an electrode for a lithium ion secondary battery, which comprises a collector and an active material layer supported on the collector; said active material layer comprising the above-mentioned binder and an active material.

In a further aspect of the present invention, there is provided a lithium ion secondary battery which has the above-mentioned electrode comprising a collector and an active material layer supported on the collector.

DESCRIPTION OF THE PREFERRED EMBODIMENTS (1) Binder

The binder of the present invention is comprised of a polymer comprising (a) structural units derived from a monofunctional ethylenically unsaturated carboxylic acid ester monomer (which units are hereinafter abbreviated to "structural units (a) when appropriate), (b) structural units derived from an ethylenically unsaturated carboxylic acid monomer (which units are hereinafter abbreviated to "structural units (b) when appropriate), and (c) structural units derived from a methacrylonitrile monomer (which units are hereinafter abbreviated to "structural units (c) when appropriate).

The ratio of [structural units (a) plus structural units(c)]/structural units (b) is in the range of 99.9 to 1.5 by weight, preferably 99.5 to 2 by weight; and the sum of structural units (a), structural units (b) and structural units (c) is at least 70% by weight, preferably at least 80% by weight, based on the weight of the total structural units of the polymer.

The polymer is substantially free from structural units derived from an ethylenically hydrocarbon monomer such as ethylene, propylene or styrene, and further substantially free from structural units derived from a diene monomer such as butadiene or isoprene. If the polymer contains structural units derived from an ethylenically hydrocarbon monomer and/or structural units derived from a diene monomer, the polymer is liable to have poor electrochemical properties.

The polymer of the present invention may comprises not larger than 30% by weight, preferably not larger than 20% by weight and more preferably not larger than 15% by weight, based on the weight of the total structural units of the polymer, of structural units as optional structural units, which are other than structural units (a), structural unite (b), structural units (c), structural units derived from an ethylenically hydrocarbon monomer and structural units derived from a diene monomer. As preferable examples of the optional structural units, there can be mentioned (d) structural units derived from a polyfunctional ethylenically unsaturated carboxylic acid ester monomer (which structural units are hereinafter referred to "structural units (d)" when appropriate), and structural units derived from a cross-linking monomer such as divinylbenzene. By the term "polyfunctional ethylenically unsaturated carboxylic acid ester monomer" used herein, we mean a carboxylic acid ester monomer having at least two ethylenically unsaturated bonds. The polymer may contain optional structural units other than structural units (d) and the cross-linking monomer units, but most preferably the polymer does not contain these optional structural units in view of high electrochemical stability of polymer.

As specific examples of the monofunctional ethylenically unsaturated carboxylic acid ester monomer giving structural units (a), there can be mentioned acrylic acid alkyl esters, the alkyl group of which may have a substituent, such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate and lauryl acrylate; methacrylic acid alkyl esters, the alkyl group of which may have a substituent, such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate and lauryl methacrylate; crotonic acid alkyl esters the alkyl group of which may have a substituent, such as methyl crotonate, ethyl crotonate, propyl crotonate, n-butyl crotonate, isobutyl crotonate, n-amyl crotonate, isoamyl crotonate, n-hexyl crotonate, 2-ethylhexyl crotonate and hydroxypropyl crotonate; dialkylamino group-containing methacrylic acid esters such as dimethylaminoethyl methacrylate and diethylaminoethyl methacrylate; alkoxy group-containing monocarboxylic acid esters, especially alkoxy group-containing acrylic acid esters and alkoxy group-containing methacrylic acid esters, such as methoxy-polyethylene glycol acrylate, ethoxy-polyethylene glycol acrylate, methoxy-diethylene glycol acrylate, ethoxy-diethylene glycol acrylate, methoxy-dipropylene glycol acrylate, methoxyethyl acrylate, 2-ethoxyethyl acrylate, butoxyethyl acrylate, phenoxyethyl acrylate, methoxy-polyethylene glycol methacrylate, ethoxy-polyethylene glycol methacrylate, methoxy-diethylene glycol methacrylate, ethoxy-diethylene glycol methacrylate, methoxy-dipropylene glycol methacrylate, methoxyethyl methacrylate, 2-ethoxyethyl methacrylate, butoxyethyl methacrylate and phenoxyethyl methacrylate; and acrylic acid alkyl esters and methacrylic acid alkyl esters, the alkyl group of which has a phosphoric acid residue, a sulfonic acid residue or a boric acid residue. Of these monofunctional ethylenically unsaturated carboxylic acid esters, acrylic acid alkyl esters and methacrylic acid alkyl esters, the alkyl group of which has 1 to 12 carbon atoms, preferably 2 to 8 carbon atoms, are especially preferable. These monomers may be used either alone or in combination.

As specific examples of the ethylenically unsaturated carboxylic acid monomer giving structural units (b), there can be mentioned ethylenically unsaturated monocarboxylic acid monomers such as acrylic acid, methacrylic acid and crotonic acid; and ethylenically unsaturated dicarboxylic acid monomers such as maleic acid, fumaric acid, citraconic acid, mesaconic acid, glutaconic acid and itaconic acid. Of these, ethylenically unsaturated monocarboxylic acid monomers such as acrylic acid and methacrylic acid are preferable. These monomers may be used either alone or in combination.

The monomer giving structural units (c) is methacrylonitrile. A methacrylonitrile-containing copolymer exhibits a low electrochemical reactivity as measured by the cyclic voltammetry at 70° C., and gives an electrode having good characteristics at repetition of charge-discharge cycles at a high temperature.

The polymer of the present invention preferably further comprises (d) structural units derived from a polyfunctional ethylenically unsaturated carboxylic acid monomer, in addition to structural units (a), structural units (b) and structural units (c). As specific examples of the polyfunctional ethylenically unsaturated carboxylic acid monomer, there can be mentioned dimethacrylic acid esters such as ethylene glycol dimethacrylate and diethylene glycol dimethacrylate; trimethacrylic acid esters such as trimethylolpropane trimethacrylate; diacrylic acid esters such as polyethylene glycol diacrylate and 1,3-butylens glycol diacrylate; triacrylic acid esters such as trimethylolpropane triacrylate; polyalkylene glycol dimethacrylates such as triethylene glycol dimethacrylate, tetraethylene glycol dimethacrylate, pentaethylene glycol dimethacrylate, hexaethylene glycol dimethacrylate, heptaethylene glycol dimethacrylate, octaethylene glycol dimethacrylate, tripropylene glycol dimethacrylate, tetrapropylene glycol dimethacrylate, pentapropylene glycol dimethacrylate, hexapropylene glycol dimethacrylate, heptapropylene glycol dimethacrylate and octapropylene glycol dimethacrylate; and corresponding polyalkylene glycol methacrylate-acrylates.

When the polymer contains structural units (d) in an amount of, based on the weight of the total structural units of the polymer not larger than 30% by weight, preferably not larger than 20% by weight and more preferably not larger than 15% by weight, and at least 0.1% by weight, preferably at least 0.5% by weight and more preferably at least 1% by weight, good and stabilized characteristics at repetition of charge-discharge cycles at a high temperature can be obtained.

As specific examples of the polymer of the present invention, there can be mentioned the following copolymers. These copolymers maybe either uncrosslinked or crosslinked. However, the copolymers are preferably crosslinked polymers in view of good resistance to an electrolyte solution. A 2-ethylhexyl (meth)acrylate/(meth) acrylic acid-methacrylonitrile copolymer (the term "(meth) acrylate" means methacrylate or acrylate, and the term "(meth)acrylic acid" means methacrylic acid or acrylic acid), a 2-ethylhexyl (meth)acrylate/ethyl (meth)acrylate/-(meth)acrylic acid/methacrylonitrile copolymer, a butyl acrylate/-(meth)acrylic acid/-methacrylonitrile copolymer, a 2-ethylhexyl (meth)acrylate/ethylene glycol dimethacrylate/ (meth)acrylic acid/methacrylonitrile copolymer, a 2-ethylhexyl (meth)acrylate/hydroxypropyl (meth)acrylate/ (meth)acrylic acid/methacrylonitrile copolymer, a diethylaminoethyl acrylate/acrylic acid/-methacrylonitrile copolymer, a methoxypolyethylene glycol monomethacrylate/(meth)acrylic acid/methacrylonitrile copolymer, a 2-ethylhexyl crotonate/-(meth)acrylic acid/ methacrylonitrile copolymer, a 2-ethylhexyl (meth)acrylate/ ethyl crotonate/(meth)acrylic acid/-methacrylonitrile copolymer, a 2-ethylhexyl (meth)acrylate/-ethyl (meth) acrylate/polyethylene glycol diacrylate/-(meth)acrylic acid/ methacrylonitrile copolymer, a butyl (meth)acrylate/ divinylbenzene/(meth)acrylic acid/-methacrylonitrile copolymer, a 2-ethylhexyl acrylate/acrylic acid/maleic acid/ methacrylonitrile copolymer, a 2-ethylhexyl (meth)acrylate/ itaconic acid/methacrylonitrile copolymer, a 2-ethylhexyl acrylate/crotonic acid/methacrylonitrile copolymer, a 2-ethylhexyl acrylate/ethyl methacrylate/crotonic acid/ methacrylonitrile copolymer, a butyl acrylate/crotonic acid/ methacrylonitrile copolymer, a 2-ethylhexyl acrylate/-ethylene glycol dimethacrylate/-crotonic acid/-methacrylonitrile copolymer, a 2-ethylhexyl methacrylate/-hydroxypropyl acrylate/crotonic acid/methacrylonitrile copolymer, a methoxypolyethylene glycol monomethacrylate/-crotonic acid/methacrylonitrile copolymer, a 2-ethylhexyl crotonate/crotonic acid/ methacrylonitrile copolymer, a 2-ethylhexyl acrylate/ethyl crotonate/crotonic acid/-methacrylonitrile copolymer, a 2-ethylhexyl methacrylate/ethyl acrylate/polyethylene glycol diacrylate/crotonic acid/-methacrylonitrile copolymer, a 2-ethylhexyl acrylate/ethyl methacrylate/itaconic acid/- methacrylonitrile copolymer, a butyl acrylate/itaconic acid/ methacrylonitrile copolymer, and a 2-ethyl/hexyl acrylate/ ethylene glycol dimethacrylate/-itaconic acid/ methacrylonitrile copolymer.

To provide a secondary battery exhibiting good characteristics at repetition of charge-discharge cycles at 60° C., it is important that a polymer binder used for the preparation of an electrode of the battery is electrochemically stable at 60° C. The electrochemical stability of a polymer binder can be measured by the cyclic voltammetry. In the cyclic voltammetry, an electric potential is scanned at a constant rate within a test specimen, and, when an oxidation or reduction reaction occurs, the peak electric current value is measured. When the peak electric current value is higher, the test specimen contains a larger amount of a substance causing an oxidation or reduction reaction.

A polymer binder used for the fabrication of a secondary battery is exposed to repeated charging-discharging. In the case where the peak electric current value of a polymer binder increases when the cyclic voltammetry is repeated, the polymer binder tends to cause an oxidation or reduction reaction at repetition of charge-discharge cycles, and thus, an electrode with the polymer binder gives a secondary battery having poor characteristics at repetition of charge-discharge cycles.

The binder of the present invention exhibits a low electric peak current value when it is tested by the cyclic voltammetry at 70° C. (details of the determining method is hereinafter described). More specifically, in the case where scanning of an electric potential scanning from 3 volts to 5 volts is repeated five times in the cyclic voltammetry at 70° C., the electric current value as measured at a voltage of 4.6 volts in the fifth cycle is not larger than 150 $\mu A/cm^2$, preferably not larger than 120 $\mu A/cm^2$ and more preferably not larger than 100 $\mu/cm^2$.

The binder of the present invention can be used as a liquid composition comprising the binder in the form of particles dispersed in a liquid medium, or a liquid composition comprising the binder dissolved in an organic solvent. In the liquid composition, another binder may be incorporated in combination with the binder of the present invention.

(2) Binder Composition

The binder composition of the present invention comprises the above-mentioned polymer and a specific liquid medium in which the polymer is dispersed in the form of particles.

In the binder composition, the amount of the polymer particles is in the range of 0.2% to 80% by weight, preferably 0.5% to 70% by weight and more preferably 0.5% to 60% by weight, as solid content, based on the weight of the binder composition.

The binder particles in the binder composition may be either particles composed of one kind of polymer, or composite particles composed of two or more kinds of polymers. The composite particles have an odd-shaped structure which includes, for example, a core-shell type structure, an islands-in-sea type structure, a side-by-side type structure, a tumbler type structure, an octopus ocellus type structure and a raspberry type structure, which are described in "Setchaku (Adhesion)" vol. 34, No. 1, p13–23, especially illustrated in FIG. 6 on page 17.

The presence of polymer binder in the form of particles can be confirmed by a transmission electron microscope or an optical microscope. The polymer particles have a volume average particle diameter in the range of 0.001 $\mu m$ to 500 $\mu m$, preferably 0.01 $\mu m$ to 200 $\mu m$. The volume average particle diameter can be measured by a Coulter counter or micro-track.

The method for preparing the binder composition of the present invention is not particularly limited. Where an organic liquid substance is used as dispersion medium, there can be adopted a method wherein an aqueous dispersion of a polymer is prepared by an ordinary procedure and then the aqueous medium is exchanged with a specific organic liquid substance. This method is advantageous in view of good production efficiency. The procedure for exchanging the aqueous medium with the organic liquid substance includes, for example, a procedure wherein an organic liquid medium is incorporated in the aqueous dispersion of polymer and then water is removed by a distillation method or a dispersion medium-phase transition method.

The procedure for preparing an aqueous dispersion of polymer (hereinafter referred to "latex" when appropriate) is not particularly limited, and includes an emulsion polymerization procedure and a suspension polymerization procedure. A dispersion polymerization procedure may also be adopted whereby a binder composition of the present invention can be directly prepared. Ordinary emulsifiers, dispersing agents, polymerization initiators and auxiliaries such as a polymerization aid can be employed and the amounts of these agents and auxiliaries can be appropriately chosen. The polymerization conditions such as polymerization temperature and polymerization time can be appropriately chosen.

A seed polymerization procedure using seed particles can also be employed.

For the preparation of a binder in the form of composite polymer particles, for example, a two stage polymerization method can be employed wherein one or more kinds of monomers are polymerized by an ordinary method, and then the remainder monomer or monomers are added to the polymerization system to be thereby polymerized.

To an aqueous dispersion of the polymer binder, an aqueous base solution can be added to adjust the pH value to a range of 4 to 11, preferably 5 to 9 whereby the bonding force between a collector and an active material is enhanced.

The liquid medium used for the preparation of the binder composition of the present invention may be either water or an organic liquid substance. Usually, a liquid medium having a boiling point in the range of 80° C. to 350° C., preferably 100° C. to 300° C., at normal pressure is used.

As preferable examples of the organic liquid substance, there can be mentioned the following substances. Numeral within each parenthesis denotes a boiling point at normal pressure as expressed by counting fractions of 0.5 and over as a whole number and disregarding the rest. Hydrocarbons such as n-dodecane (216), decahydronaphthalene (189–191) and tetralin (207); alcohols such as 2-ethyl-1-hexanol (184) and 1-nonanol (214); ketones such as phorone (197), acetophenone (202) and isophorone (215); esters such as benzyl acetate (213), isopentyl butyrate (184), -butyrolactone (204), methyl lactate (143), ethyl lactate (154) and butyl lactate (185); amines such as o-toluidine (200), m-toluidine (204) and p-toluidine (201); amides such as N-methyl-2-pyrrolidone (202), N,N-dimethylacetamide (194) and dimethylformamide (153); and sulfoxides and sulfones, such as dimethylsulfoxide (189) and sulfolane (287). Among the liquid mediums, water, N-methyl-2-pyrrolidone, methyl lactate and ethyl lactate are preferable.

Preferably, the polymer binder of the present invention should have a low solubility in an electrolyte solution with a view to enhanced durability of the binding force thereof in an electrode made with the polymer binder. The enhanced durability tends to influence the characteristics at repetition of charge-discharge cycles of a battery. The solubility of the polymer binder in an electrolyte solution is expressed in terms of gel content of the polymer binder. By the term "gel content" herein used, we mean gel content of the polymer binder as calculated as insoluble matter in an electrolyte solution which is a 1 mole/liter solution of $LiPF_6$ in a mixed liquid comprised of ethylene carbonate/diethyl carbonate at a ratio of 50/50 by volume at 20° C. The polymer binder of the present invention preferably has a gel content of 50% to 100% by weight, more preferably 60% to 100% by weight and most preferably 70% to 100% by weight.

Additives such as a viscosity modifier and a fluidizing agent can be added in the binder composition of the present invention to improve properties of a slurry for an electrode of a secondary battery, hereinafter described. As specific examples of the additives, there can be mentioned cellulosic materials such as carboxymethyl cellulose, methyl cellulose and hydroxypropyl cellulose, and ammonium salts and alkali metal salts of these cellulosic materials; alkali metal salts and ammonium salts of polyacrylic acid and polymethacrylic acid, such as sodium polyacrylate and sodium methacrylate; polyvinyl alcohol, polyethylene oxide, polyvinyl pyrrolidone, a copolymer of acrylic acid or its salt with vinyl alcohol, a copolymer of maleic anhydride, maleic acid or fumaric acid with vinyl alcohol, modified polyvinyl alcohol, modified polyacrylic acid, polyethylene glycol, polycarboxylic acid, polyacrylonitrile, polymethacrylonitrile, an ethylene-vinyl alcohol copolymer, a vinyl acetate polymer, and fluoropolymers such as polyvinylidene fluoride, polytetrafluoroethylene and polypentafluoropropylene. The amount of these additives can be appropriately chosen according to the need. These additives may be either in the form of particles dispersed in the liquid dispersion medium, or dissolved therein. When an additive remaining in an electrode is used, an additive having good electrochemical stability should preferably be chosen.

(3) Slurry for Electrode of Secondary Battery

The slurry of the present invention for an electrode of a secondary battery comprises the above-mentioned binder, an active material, mentioned below, and optional additives. The procedure for preparing the slurry is not particularly limited. For example, the slurry is prepared by mixing a dispersion or solution of the binder of the present invention in a liquid medium, with an active material and optional additives. An especially preferable slurry is prepared by mixing the above-mentioned binder composition comprising binder particles dispersed in a liquid dispersion medium, with an active material and optional additives. This preferable slurry gives a secondary battery exhibiting improved charge-discharge cycling characteristics.

The active material used is not particularly limited provided that it is used for ordinary lithium ion secondary battery.

As specific examples of the active material for a negative electrode, there can be mentioned carbonaceous materials such as amorphous carbon, graphite, natural graphite, MCMB (meso-carbon micro beads) and pitch carbon fiber, electrically conductive polymers such as polyacene, and composite metal oxides and other metal oxides.

As specific examples of the active material for a positive electrode, there can be mentioned metal sulfides and metal oxides such as $TiS_2$, $TiS_3$, amorphous $MoS_3$, $Cu_2V_2O_3$, amorphous $V_2O$-$P_2O_5$, $MoO_3$, $V_2O_5$ and $V_6O_{13}$; and lithium-containing composite metal oxides such as $LiCoO_2$, $LiNiO_2$, $LiMnO_2$ and $LiMn_2O_4$. The composition of elements contained in these metal compounds is usually not in conformity with the stoichiometric composition. The active material for a positive electrode further includes organic compounds including electrically conductive polymers such as polyacetylene and poly-p-phenylene.

The amount of an active material in the slurry for an electrode of a secondary battery is not particularly limited and is usually 1 to 1,000 times, preferably 2 to 500 times and more preferably 3 to 500 times of the weight of the polymer binder. When the amount of an active material is too small, the electrode is liable to have poor performances. When the amount of an active material is too large, the adhesion of the active material to a collector becomes poor and the active material tends to be fallen from the collector. The amount of a liquid medium such as water or an organic liquid can be appropriately chosen so that the concentration of an active material in the slurry be suitable for coating a collector with the slurry.

According to the need, additives such as a viscosity modifier and a fluidizing agent, which are hereinbefore mentioned as for the binder composition of the present invention, can be incorporated in the slurry. Further, electrically conductive materials including carbon such as graphite and active carbon, and a metal powder, can be incorporated in the slurry provided that the object of the invention can be achieved.

(4) Electrode for Lithium Ion Secondary Battery

The electrode of the present invention for a lithium ion secondary battery comprises a collector and an active material layer which comprises the above-mentioned binder and an active material and is supported on the collector.

The electrode is fabricated, or example, by a procedure wherein a collector such as a metal foil is coated with the above-mentioned slurry of the present invention, and the thus-formed coating is dried whereby an active material is fixed on the surface of the collector. The electrode may be either a positive electrode or a negative electrode, but is preferably a positive electrode because the advantages of the present invention are conspicuously manifested.

The collector used is not particularly limited provided that it is composed of an electrically conductive material. The collector is usually composed of metal such as iron, copper, aluminum, nickel or stainless steel. The shape of the collector is also not particularly limited, and the collector is usually used in a sheet form having a thickness of about 0.001 mm to 0.5 mm.

The collector can be coated with the above-mentioned slurry by a conventional coating procedure such as doctor-blade coating, dip coating, reverse-roll coating, direct-roll coating, gravure coating, extrusion coating and brush coating. The amount of the slurry applied is not particularly limited, and is usually such that the thickness of the dried coating formed on tho collector has a thickness of about 0.005 mm to 5 mm, preferably about 0.01 mm to 2 mm. The procedure for drying an as-formed coating is not particularly limited, and includes, for example, warm-air drying, hot-air drying, low-humid-air drying, vacuum drying, infrared drying, far-infrared drying, electron radiation drying. The drying conditions should be chosen so that the liquid medium used is removed as soon as possible provided that occurrence of stress crack in the active material layer due to stress concentration, and separation of the active material layer from the collector can be avoided.

The electrode can be pressed, if desired, to enhance the density of the active material layer. The pressing can be carried out by a conventional procedure, such as a mold pressing and a roll pressing.

(5) Lithium Ion Secondary Battery

The lithium secondary battery of the present invention comprises the above-mentioned electrode, an electrolyte solution, and a separator and other elements according to the need. The lithium ion secondary battery is fabricated by a conventional procedure. For example, a positive electrode and a negative electrode are superposed with a separator interposed between the two electrodes, and the thus-formed assembly is wound or folded and then inserted into a vessel. An electrolyte solution is introduced into the vessel, and the vessel is sealed. The shape of the secondary battery is not particularly limited, and is, for example, coin-shape, cylindrical shape, rectangular shape and flat shape.

The electrolyte solution is selected from those which are conventionally used for a lithium ion secondary battery. A suitable electrolyte solution can be chosen depending upon the particular active material used so as to obtain the desired battery performances.

The electrolyte of the secondary battery includes known lithium salts. As specific examples of the electrolyte, there can be mentioned $LiClO_4$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$ and lithium salts of lower fatty acids.

The liquid medium used for dissolving the electrolyte is not particularly limited and includes conventional liquid mediums. As specific examples of the liquid medium, there can be mentioned carbonates such as propylene carbonate, ethylene carbonate, butylene carbonate, dimethyl carbonate and diethyl carbonate; and lactones such as γ-butyrolactone.

The invention will now be described more specifically by the following working examples that by no means limit the scope of the invention.

In the working examples, parts and % are by weight unless otherwise specified.

Properties of binders and batteries were evaluated by the following methods.

(1) Properties of Binders (1-i) Gel Content (%)

The gel content of binder is defined as the proportion of a polymer binder which is insoluble in an electrolyte solution.

A glass plate is coated with a dispersion of a polymer binder dispersed in water or an organic liquid to form a filmy coating having a thickness of about 0.1 mm. The filmy coating is air-dried at 120° C. for 24 hours and further vacuum-dried at 120° C. for 2 hours. The dry film is weighed (weight: D1) and then is placed within a cage made of a SUS wire mash with a 200 mesh size. $LiPF_6$ is dissolved in a mixed liquid composed of ethylene carbonate and diethyl carbonate (mixing ratio: 50/50 by volume at 20° C.) to prepare an electrolyte solution having a concentration of 1 mol/liter. The dry film-placed cage is dipped in the electrolyte solution at 60° C. for 72 hours, and then, filtered through a wire mesh sieve with a 200 mesh size. The insoluble matter remaining on the sieve is vacuum-dried at 120° C. for 2 hours and then weighed (weight: D2). The gel content is calculated according to the equation:

$$\text{Gel content } (\%) = (D2/D1) \times 100$$

The larger the gel content, the more stable for an electrolyte solution the polymer binder.

(1-ii) Electrochemical Stability (CV value)

The electrochemical stability is measured by the cyclic voltammetry as follows.

A dispersion of a polymer binder in water or an organic liquid is mixed with acetylene black in an amount such that the ratio of acetylene black to the polymer binder is 100/40 by weight, to prepare a uniform slurry. An aluminum foil is coated with the slurry, and the as-formed coating is air-dried at 120° C. for 2 hours and further vacuum-dried at 120° C. to prepare an electrode having a thickness of 50 μm. This electrode is used as a working electrode. A counter electrode and a reference electrode are made of a lithium foil. An electrolyte solution used is made by dissolving $LiPF_6$ at a concentrate on of 1 mole/liter in a mixed liquid comprised of ethylene carbonate/diethyl carbonate at a ratio of 70/30 by volume at 20° C.

A potentiostat ("HA-301" available from Hokuto Denko K.K.) and a simplified function generator ("HB-111" available from Hokuto Denko K.K.) were used for measurement the current value. The sweep conditions were as follows. Temperature: 70° C., initial potential: 3V, return potential: 5V, and sweep rate; 5 mV/sec. Triangular pulse sweep was conducted continuously with five returns, and the current value per unit area (CV value, $\mu A/cm^2$) was measured at a potential of 4.6 V.

If the CV value as measured at the fifth cycle is not larger than 150 $\mu A/cm^2$, the electrochemical stability of a binder is acceptable. The measurement of the conventional polyvinylidene fluoride (PVDF) revealed that its CV value was 138 $\mu A/cm^2$.

(2) Property of Electrodes—Bending Test

An electrode, fabricated by the method described below, is cut to a strip of 2 cm width×7 cm length. A stainless steel wire having a diameter of 0.7 mm is placed at the center of the strip perpendicularly to the length of the strip. The strip is bent at an angle of 180° along the stainless steel wire, and the state of a film coating on the electrode at the bent portion is observed. This bending test is conducted on tan electrode specimens. The evaluation results are expressed by the following two ratings.

Rating A: crack formation in a film coating and peeling thereof are not observed at all on ten specimens.

Rating B: crack formation in a film coating or peeling thereof is observed on at least one of ten specimens.

(3) Property of Secondary Battery—Characteristics at Repetition of Charge-Discharge Cycles at High Temperature A coin shaped secondary battery specimen is fabricated by the method described below. A negative electrode test is conducted at a voltage from 0 V to 1.2 V by using a lithium metal positive electrode, and a positive electrode test is conducted at a voltage from 3 V to 4.2 V by using a lithium metal negative electrode, at a temperature of 60° C. and at a constant current of 0.4 C. The retention of capacity at repetition of charge-discharge cycles is expressed by percentage of the ratio (A/B) of service capacity (A) as measured at the 30th cycle to service capacity (B) as measured at the third cycle. The larger the percentage of A/B, the smaller the capacity reduction at repetition of charge-discharge cycles.

Fabrication of Coin-Shaped Secondary Battery

A positive electrode with a polymer binder for evaluation is prepared as follows. An aluminum foil collector having a thickness of 20 μm is coated with an active material-containing slurry for positive electrode by a doctor blade. The as-formed coating is dried at 120° C. for 15 minutes in a drier, and further vacuum-dried under 0.6 kPa at 120° C. for 2 hours. The dried coated aluminum foil is pressed by a twin roll press so that the density of an active material is 3.2 $g/cm^3$ to prepare a positive electrode having an active material layer with a thickness of 80 μm. A counter electrode used in combination with the positive electrode is made of lithium metal.

A negative electrode with a polymer binder for evaluation is prepared by the same procedure as that mentioned above for the preparation of the positive electrode except that a copper foil collector having a thickness of 18 μm is coated with an active material-containing slurry for negative electrode, and the dried coated copper foil is pressed so that the density of an active material is 1.5 $g/cm^3$. A counter electrode used in combination with the negative electrode is made of lithium metal.

The positive electrode and negative electrode are cut into a circular shape having a diameter of 15 mm. A battery is fabricated by using the circular positive electrode or the circular negative electrode, a lithium metal counter electrode and a separator, which is sandwiched between the positive electrode or the negative electrode and the lithium metal counter electrode so that the active material layers of the two electrodes confront to each other. The separator is comprised of a circular porous polypropylene film having a diameter of 18 mm and a thickness of 25 μm. An assembly of the two electrodes and the separator is placed in a coin-shaped outer casing having a diameter of 20 mm and a height of 1.8 mm and made of a stainless steel sheet having a thickness 0.25 mm, so that the aluminum foil of the positive electrode or lithium metal is kept in contact with the casing bottom. An expanded metal part is placed on the copper foil of the negative electrode or on lithium metal of the counter electrode. A polypropylene packing is packed within the casing. An electrolyte solution, which is a solution of $LiPF_6$ with a concentration of 1 mol/liter of a mixed liquid composed of ethylene carbonate and diethyl carbonate at a mixing ratio of 50/50 by volume, is injected into the casing so that no air remains within the casing. The thus-fabricated assembly is covered with a stainless steel cap having a thickness of 0.2 mm via the polypropylene packing. The assembly-packed casing is sealed whereby a coin-shaped battery having a diameter of 20 mm and a thickness of about 2 mm is obtained.

EXAMPLE 1

80 parts of 2-ethylhexyl acrylate, 8 parts of acrylic acid and 15 parts of methacrylonitrile were copolymerized in an aqueous medium by an emulsion polymerization procedure using ammonium persulfate as polymerization initiator and sodium dodecylbenzenesulfonate as emulsifier. A latex (A) containing 28% of polymer particles (a) was obtained. The polymerization conversion as measured from the solid concentration of latex (A) is about 100%.

5 parts of acetylene black, latex (A) in an amount corresponding to 2 parts of solid polymer particles (a), and 1 part of carboxymethyl cellulose sodium salt were added to 92 parts of lithium cobaltate. Water was added so that the solid content in the slurry was 70%, and the slurry was thoroughly stirred to obtain a uniform slurry for a positive electrode. A positive electrode was prepared from the slurry by the method mentioned above for the fabrication of lithium ion secondary battery. A secondary battery was fabricated by using the positive electrode, and a lithium metal negative electrode.

Properties of the binder (polymer particles (a)), the positive electrode and the secondary battery were evaluated. The results are shown in Table 1.

EXAMPLE 2

A latex (B) containing 30% of polymer particles (b) was prepared by the same emulsion polymerization procedure as employed in Example 1 except that 84 parts of 2-ethylhexyl acrylate, 2 parts of methacrylic acid, 10 parts of methacrylonitrile, 2 parts of ethylene glycol dimethacrylate and 2 parts of methoxypolyethylene glycol methacrylate were used. All other conditions remained substantially the same. The polymerization conversion was 99%.

A positive electrode was prepared and a secondary battery was fabricated from the positive electrode by the same procedures as employed in Example 1 except that latex (B) was used instead of latex (A).

Properties of the binder (polymer particles (b)), the positive electrode and the secondary battery were evaluated. The results are shown in Table 1.

EXAMPLE 3

A latex (C) containing 25% of polymer particles (c) was prepared by the Same emulsion polymerization procedure as employed in Example 2 except that 84 parts of 2-ethylhexyl methacrylate was used instead of 2-ethylhexyl acrylate with all other conditions remaining substantially the same. The polymerization conversion was about 100%.

A positive electrode was prepared and a secondary battery was fabricated from the positive electrode by the same procedures as employed in Example 1 except that latex (C) was used instead of latex (A).

Properties of the binder (polymer particles (c)), the positive electrode and the secondary battery were evaluated. The results are shown in Table 1.

EXAMPLE 4

To 100 parts of latex (A) prepared in Example 1, 300 parts of N-methyl-2-pyrrolidone (hereinafter abbreviated to "NMP" when appropriate) was added. The resulting mixed solution was kept under a reduced pressure by using a vacuum pump while being stirred, and then the solution was heated at 80° C. to remove water. Thus, an NMP dispersion (A) containing 10% of polymer particles (a) was obtained.

A positive electrode was prepared and a secondary battery was fabricated from the positive electrode by the same procedures as employed in Example 1 except that NMP dispersion (A) was used instead of latex (A), NMP was used instead of water, and α-hydroxypropyl-etherified starch was used instead of carboxymethyl cellulose sodium salt for the preparation of the positive electrode.

Properties of the binder (polymer particles (a)), the positive electrode and the secondary battery were evaluated. The results are shown in Table 1.

EXAMPLE 5

An NMP dispersion (B) containing 10% of polymer particles (b) was prepared by the same procedure as employed in Example 4 except that latex (B) was used instead of latex (A) with all other conditions remaining substantially the same.

A positive electrode was prepared and a secondary battery was fabricated from the positive electrode by the same procedures as employed in Example 4 except that NMP dispersion (B) was used instead of NMP dispersion (A) for the preparation of the positive electrodes.

Properties of the binder (polymer particles (b)), the positive electrode and the secondary battery were evaluated. The results are shown in Table 1.

Comparative Example 1

A latex (P) containing 33% of polymer particles (p) was prepared by the same emulsion polymerization procedure as employed in Example 1 except that acrylonitrile was used instead of methacrylonitrile with all other conditions remaining substantially the same. The polymerization conversion was 99%.

A positive electrode was prepared and a secondary battery was fabricated from the positive electrode by the same procedures as employed in Example 1 except that latex (P) was used instead of latex (A) for the preparation of the positive electrode.

Properties of the binder (polymer particles (p)), the positive electrode and the secondary battery were evaluated. The results are shown in Table 1.

Comparative Example 2

An NMP dispersion (Q) containing 10% of polymer particles (q) was prepared by the same procedure as employed in Example 5 except that the amount of methacrylonitrile was reduced to zero with all other conditions remaining substantially the same. The polymerization conversion was about 100%.

A positive electrode was prepared and a secondary battery was fabricated from the positive electrode by the same procedures as employed in Example 5 except that NMP dispersion (Q) was used instead of NMP dispersion (B) for the preparation of the positive electrode.

Properties of the binder (polymer particles (q)), the positive electrode and the secondary battery were evaluated. The results are shown in Table 1.

EXAMPLE 6

Latex (A), prepared in Example 1, in an amount corresponding to 3 parts of solid polymer particles (a), and 1 part of carboxymethyl cellulose sodium salt were added to 97 parts of natural graphite. Water was added to the thus-prepared slurry so that the solid content of the slurry is 40%, and then the slurry was thoroughly stirred to prepare a slurry for a negative electrode.

A negative electrode was prepared from the slurry by the method mentioned above for the fabrication of lithium ion secondary battery. A secondary battery was fabricated by using the negative electrode, and a lithium metal positive electrode.

Properties of the binder (polymer particles (a)), the negative electrode and the secondary battery were evaluated. The results are shown in Table 1,

EXAMPLE 7

A negative electrode was prepared and a secondary battery was fabricated from the negative electrode by the same procedures as employed in Example 6 except that NMP dispersion (B) was used instead of latex (A) and NMP was used instead of water for the preparation of the negative electrode.

Properties of the binder (polymer particles (b)), the negative electrode and the secondary battery were evaluated. The results are shown in Table 1.

Comparative Example 3

A negative electrode was prepared and a secondary battery was fabricated from the negative electrode by the same procedures as employed in Example 6 except that latex (P) was used instead of latex (A) for the preparation of the negative electrode.

Properties of the binder (polymer particles (b)), the negative electrode and the secondary battery were evaluated. The results are shown in Table 1.

Comparative Example 4

A negative electrode was prepared and a secondary battery was fabricated from the negative electrode by the same procedures as employed in Example 7 except that NMP dispersion (Q) was used instead of NMP dispersion (P) for the preparation of the negative electrode.

Properties of the binder (polymer particles (q)), the negative electrode and the secondary battery were evaluated. The results are shown in Table 1.

As seen from Table 1, the conventional binder containing acrylonitrile units exhibits a high electrochemical reactivity as measured by the cyclic voltammetry at 70° C. A lithium ion secondary battery with an electrode made by using the conventional binder has poor characteristics at repetition of charge-discharge cycles at a high temperature. In contrast, the binder of the present invention, which contains methacrylonitrile units in place of acrylonitrile units, exhibits a low electrochemical reactivity. A lithium ion secondary battery with an electrode made by using the binder of the present invention has good characteristics at repetition of charge-discharge cycles at a high temperature.

TABLE 1

|  | Examples |  |  |  |  |  |  | Comparative Examples |  |  |  |
|---|---|---|---|---|---|---|---|---|---|---|---|
|  | 1 | 2 | 3 | 4 | 5 | 6 | 7 | 1 | 2 | 3 | 4 |
| Electrode*1 | P | P | P | P | P | N | N | P | P | N | N |
| Properties of binder |  |  |  |  |  |  |  |  |  |  |  |
| Gel content (%) | 92 | 88 | 94 | 92 | 88 | 92 | 88 | 77 | 67 | 77 | 67 |
| CV value ($\mu A/cm^2$) | 54 | 40 | 35 | 54 | 40 | 54 | 40 | 169 | 194 | 169 | 194 |
| Properties of electrode | A | A | A | A | A | A | A | B | B | B | B |
| Bending characteristics |  |  |  |  |  |  |  |  |  |  |  |
| Properties of battery | 78 | 71 | 74 | 75 | 68 | 69 | 71 | 35 | 21 | 11 | 28 |
| Retention of capacity (%)*2 |  |  |  |  |  |  |  |  |  |  |  |

Note
*1 P: positive electrode, N: negative electrode
*2 Retention of capacity at repetition of charge-discharge cycles at a high temperature

What is claimed is:

1. A binder for an electrode of a lithium ion secondary battery, which is comprised of a polymer comprising:
   (a) structural units derived from a monofunctional ethylenically unsaturated carboxylic acid ester monomer,
   (b) structural units derived from an ethylenically unsaturated carboxylic acid monomer, and
   (c) structural units derived from a methacrylonitrile monomer;
       the ratio of [structural units (a) plus structural units (c)]/structural units (b) being in the range of 99.9 to 1.5 by weight;
       the sum of structural units (a), structural units (b) and structural units (c) being at least 70% by weight based on the weight of the total structural units of the polymer; and
       said polymer being free from structural units derived from an ethylenically hydrocarbon monomer and structural units derived from a diene monomer.

2. The binder for an electrode of a lithium ion secondary battery according to claim 1, wherein said polymer further comprises (d) structural units derived from a polyfunctional ethylenically unsaturated carboxylic acid ester monomer.

3. The binder for an electrode of a lithium ion secondary battery according to claim 1, wherein structural units (a) are structural units derived from at least one monomer selected from the group consisting of alkyl acrylates and alkyl methacrylates.

4. The binder for an electrode of a lithium ion secondary battery according to claim 1, wherein structural units (b) are structural units derived from at least one monomer selected from the group consisting of acrylic acid and methacrylic acid.

5. A binder composition for an electrode of a lithium ion secondary battery, which comprises a polymer as described in claim 1, and a liquid medium having a boiling point in the range of 80° C. to 350° C. at normal pressure; said polymer being in the form of particles dispersed in the liquid medium.

6. The binder composition for an electrode of a lithium ion secondary battery according to claim 5, wherein said polymer further comprises (d) structural units derived from a polyfunctional ethylenically unsaturated carboxylic acid ester monomer.

7. The binder composition for an electrode of a lithium ion secondary battery according to claim 5, wherein structural units (a) are structural units derived from at least one monomer selected from the group consisting of alkyl acrylates and alkyl methacrylates.

8. The binder composition for an electrode of a lithium ion secondary battery according to claim 5, wherein structural units (b) are structural units derived from at least one monomer selected from the group consisting of acrylic acid and methacrylic acid.

9. The binder composition for an electrode of a lithium ion secondary battery according to claim 5, wherein said binder composition comprises the polymer particles in an amount of 0.2% to 80% by weight, as solid content, based on the weight of the binder composition.

10. The binder composition for an electrode of a lithium ion secondary battery according to claim 5, wherein said liquid medium comprises at least one substance selected from the group consisting of water, N-methylpyrrolidone, methyl lactate and ethyl lactate.

11. The binder composition for an electrode of a lithium ion secondary battery according to claim 5, wherein said polymer has a gel content of 50% to 100% by weight.

12. A slurry for an electrode of a lithium ion secondary battery, which comprises a binder as claimed in claim 1, and an active material.

13. The slurry for an electrode of a lithium ion secondary battery according to claim 12, wherein said polymer further comprises (d) structural units derived from a polyfunctional ethylenically unsaturated carboxylic acid ester monomer.

14. The slurry for an electrode of a lithium ion secondary battery according to claim 12, wherein structural units (a) are structural units derived from at least one monomer selected from the group consisting of alkyl acrylates and alkyl methacrylates.

15. The slurry for an electrode of a lithium ion secondary battery according to claim 12, wherein structural units (b) are structural units derived from at least one monomer selected from the group consisting of acrylic acid and methacrylic acid.

16. An electrode of a lithium ion secondary battery, which comprises a collector and an active material layer supported on the collector; said active material layer comprising a binder as claimed in claim 1, and an active material.

17. A lithium ion secondary battery, which has an electrode as claimed in claim 16.

\* \* \* \* \*